O. E. KUBENKA AND A. W. JANSZEN.
CULTIVATOR.
APPLICATION FILED SEPT. 5, 1917.
1,320,068.
Patented Oct. 28, 1919.
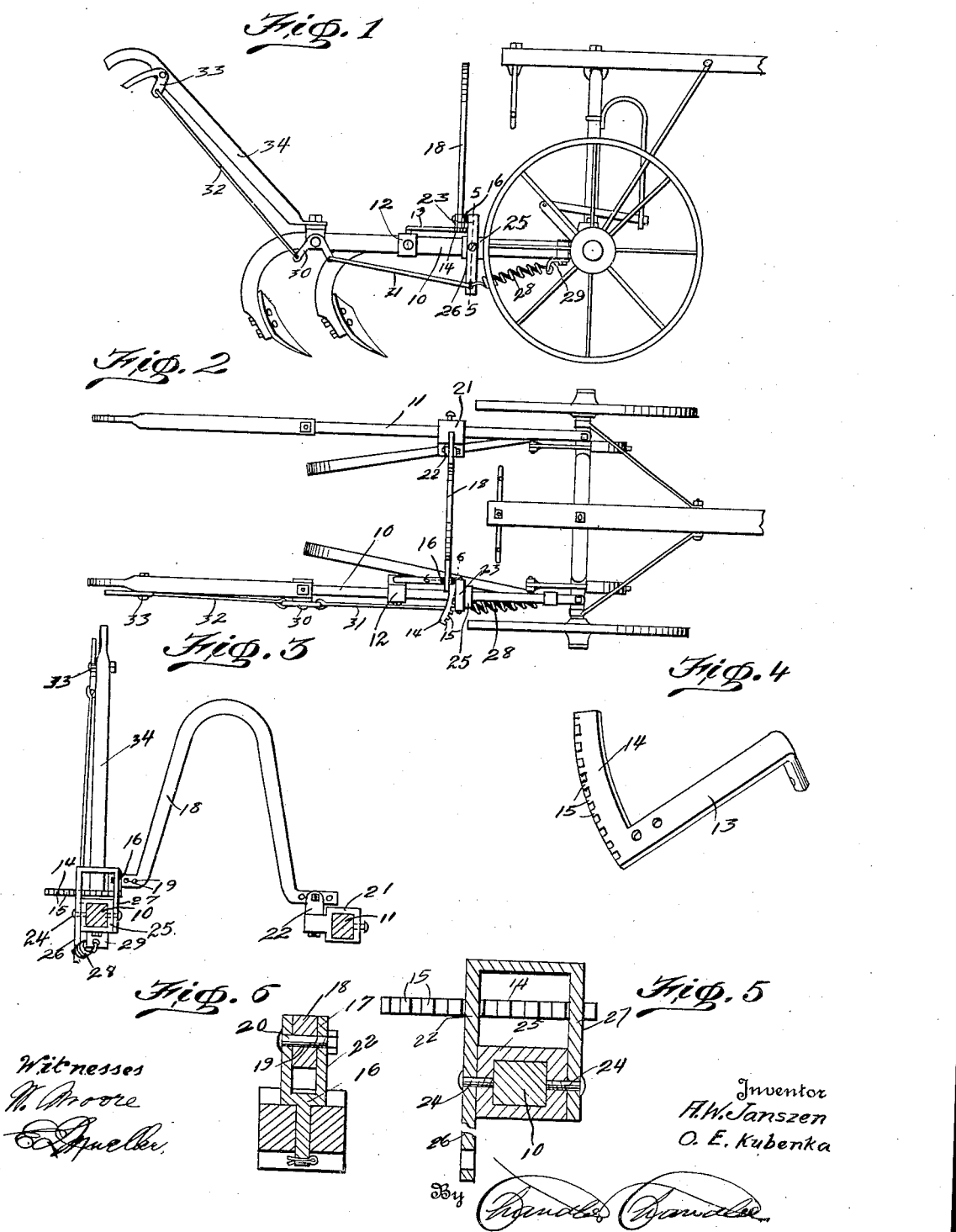
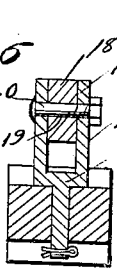

UNITED STATES PATENT OFFICE.

OTTO E. KUBENKA AND AUGUST W. JANSZEN, OF MOULTON, TEXAS.

CULTIVATOR.

1,320,068. Specification of Letters Patent. Patented Oct. 28, 1919.

Application filed September 5, 1917. Serial No. 189,896.

*To all whom it may concern:*

Be it known that we, OTTO E. KUBENKA and AUGUST W. JANSZEN, citizens of the United States, residing at Moulton, in the county of Lavaca, State of Texas, have invented certain new and useful Improvements in Cultivators; and I do hereby declare the following to be a full, clear, and exact description of the invention, such as will enable others skilled in the art to which it apertains to make and use the same.

This invention is an improvement in agricultural machines and has particular reference to an attachment for cultivators whereby the beams thereof may be adjusted various distances apart.

An object of the invention is to provide an attachment of simple and inexpensive construction which will facilitate the adjustment of the beams and which may be operated while the cultivator is in use.

Another object is the provision of an attachment which may be easily and quickly applied to cultivators of ordinary construction.

The inventive idea involved is capable of receiving a variety of mechanical expressions, one of which, for the purpose of illustrating the invention, is shown in the accompanying drawing, wherein:—

Figure 1 is a fragmentary side elevation of a cultivator showing the attachment applied and constructed in accordance with the invention.

Fig. 2 is a top plan view.

Fig. 3 is a transverse section.

Fig. 4 is a perspective view of the pivoted spreader element.

Fig. 5 is a section on the line 5—5 of Fig. 1.

Fig. 6 is a section on the line 6—6 of Fig. 2.

In the drawing, the numeral 10 indicates one of the beams of a cultivator pivotally connected at its forward end to the cultivator frame as through the medium of the axle thereof, while the other beam 11 thereof, which is adapted to be adjusted laterally in connection with the beam 10 in order to vary the distance between said beams to accommodate the treatment of rows of plants separated by spaces of different widths, is also similarly pivotally connected at its forward end. In this manner, the means are mounted to be adjusted or swung laterally toward and away from each other.

The beam 10 preferably has adjustably mounted thereon the bearing 12 in which is mounted one end of a pivoted spreading element 13 preferably in the form of a bar having the end offset and its pivot provided with a laterally curved extension or rack bar 14 provided with teeth 15 upon one edge thereof. Rotatably mounted in the bar 13 at a point contiguous to the extension 14 is a bracket 16 having its upper end bifurcated to form lugs 17 which receive therebetween one end of an arched connecting yoke 18, said end being provided with a number of openings 19 whereby the same may be adjustably secured to the bracket 16 by means of a fastening bolt 20. The beam 11 of the cultivator is also provided with an adjustable bearing 21 in which is mounted a bracket 22 similar in construction to the bracket 16 and adapted to have adjustably secured thereto the other apertured end of the yoke 18. It will thus be apparent from the foregoing description that when the spreading element 13 is adjusted about its pivot, the beam 11 will be swung toward and away from the beam 10 so that the distance between said beams may be varied, the rotatable mounting of the brackets 16 and 22 making this adjustment possible.

Means are provided in connection with the invention for retaining the beams in their adjusted positions and to this end, use is preferably made of a locking member 23 pivoted at 24 to a bearing 25 adjustably secured to the beam 10, through the medium of the clamping screws 24 constituting the pivots of the locking member 23 engaging the opposite face of the beam 10, said member being formed from a bar bent to provide long and short arms 26 and 27. The short arm 27 is normally held in engagement with any one of the teeth 15 by means of a coil spring 28 one end of which is connected to the lower end of the long arm 26 while the other end is secured to a lug 29 carried near the forward end of the beam 10.

Should it be desired to make an adjustment of the beams, it is first necessary that the arm 27 be disengaged from the teeth of the extension or rack bar 14 of the spreading element 13 and for this purpose the beam 10 has pivotally mounted thereon a bell crank lever 30, one end of which is connected to the lower end of the arm 26 of the member 23 by means of a link 31. The other end of the bell crank lever is connected, by a second link 32 to a bell crank lever 33 pivoted adjacent the upper end of the handle 34, the lower end of said handle being secured to the beam 10. By pulling upwardly upon the free end of the lever 33 it will be apparent that, through the medium of the links 31 and 32 and lever 30, the rocking member 23 will be rocked about its pivots and the arm 27 thereof disengaged from the teeth 15, thus permitting of the spreading element 13 being swung about its pivot by swinging the beam 10 laterally toward or away from the beam 11 through the medium of the handles 34 which are rigid with said beams, whereby to adjust the beam 11 relative to the beam 10. By this means, the distance between the beams 10 and 11 can be regulated, the arched connecting yoke 18 and the pivoted spreading element 13 constituting a connection between the beams which can be adjusted by engagement of the locking member 23 with respective notches of the rack bar or extension 14, so that it will be further apparent that this adjustment may be made while the cultivator is in operation and that the lever 33 may be manipulated by a person either walking behind the cultivator or riding thereon.

What is claimed is:—

1. In a cultivator, the combination with a pair of relatively movable beams, of an angular bar having one arm extended longitudinally of one of the beams and having its free end pivotally connected with the beam, the other end of said angular bar extending transversely across the beam, an arcuately arranged series of ratchet teeth on said other arm, a pawl member on the beam engageable with the teeth and a spacing bar secured to the angular bar at the juncture of its arms and secured to the other beam.

2. In a cultivator, the combination with a pair of relatively movable beams, of a bearing slidably mounted on one of said beams, an angular bar having the free end of one of its arms pivotally connected with the bearing and having its other arm extended transversely across the beam, an arcuate series of ratchet teeth on said other arm, a second bearing slidably adjustable on said beam, a pawl carried by said bearing and engagable with the teeth of the transverse arm of the angle bar, means for controlling engagement of said pawl with the teeth, a bearing slidably adjustable on the other beam and a spacing bar pivotally connected with the said last named bearing and with the angle bar.

3. A cultivator comprising a pair of longitudinal beams pivoted at their forward ends for lateral swinging movement toward and away from each other, ground working members carried by said beams, handle bars at the rear ends of the beams, a bar connected with one of the beams and movable transversely of the other beam and means for preventing relative movement of said bar and said other beam including a control member carried by one of the handle bars.

4. In a cultivator, the combination of a pair of relatively adjustable beams, a spreading element pivoted to one of said beams and having a lateral toothed extension at one end, a connection between said spreading element and the other beam whereby the latter may be adjusted when said spreading element is swung about its pivot, a locking device including a long and short arm each pivoted to the first named beam, the short arm being adapted for engagement with any one of the teeth of the extension of said spreading element whereby to retain the same in adjusted positions, a spring connected to the long arm of said locking device for normally retaining the same in locking position, and means also connected to the long arm of said locking device for adjusting the same to unlocking position.

5. The combination with the beams of a cultivator mounted for lateral swinging movement relative to each other for spacing the same at different distances apart; of connecting means between the beams comprising a yoke connected to one beam, a bar pivoted to the other beam for laterally swinging movement and having pivotal connection at its free end with the other end of the yoke whereby to form a jointed connection between the beams, a locking member mounted on the beam with said bar and engagable with the free end of the bar to hold the latter in adjusted position angularly, means to normally hold said locking member in operative position and means permitting actuation of said locking member by the operator of the cultivator to disengage the same whereby to permit relative movements of the beams as and for the purposes specified.

In testimony whereof, we affix our signatures in the presence of two witnesses.

OTTO E. KUBENKA.
AUGUST W. JANSZEN.

Witnesses:
J. T. JAEGGLI,
GEO. VON LIENEN.

Copies of this patent may be obtained for five cents each, by addressing the "Commissioner of Patents, Washington, D. C."